United States Patent
Jeong

(10) Patent No.: US 12,015,508 B2
(45) Date of Patent: Jun. 18, 2024

(54) SYSTEM AND OPERATING METHOD THEREOF

(71) Applicant: SK hynix Inc., Icheon (KR)

(72) Inventor: Jong Heon Jeong, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 18/069,051

(22) Filed: Dec. 20, 2022

(65) Prior Publication Data

US 2023/0379197 A1   Nov. 23, 2023

(30) Foreign Application Priority Data

May 18, 2022   (KR) .......................... 10-2022-0061017
Jun. 30, 2022   (KR) .......................... 10-2022-0080852

(51) Int. Cl.
*H03H 7/40*   (2006.01)
*H04L 25/03*   (2006.01)

(52) U.S. Cl.
CPC .............. *H04L 25/03878* (2013.01)

(58) Field of Classification Search
CPC ... H04L 2025/03808; H04L 43/082304; H04L 25/03038; H04L 7/0016; H04L 1/0036; H04L 27/01; H04L 7/0058; H04B 17/15; H04B 17/318; H04B 17/0085; H04B 1/0475; G06F 11/0772; G06F 11/3041; G06F 11/141

USPC .......................................................... 375/232
See application file for complete search history.

(56) References Cited

U.S. PATENT DOCUMENTS

| 9,337,993 B1 * | 5/2016 | Lugthart ............... H04L 7/0037 |
| 11,467,909 B1 * | 10/2022 | Jeon ..................... G06F 13/4221 |
| 2018/0227149 A1 * | 8/2018 | Johnson ............ H04L 25/03114 |

FOREIGN PATENT DOCUMENTS

| KR | 10-1593029 B1 | 2/2016 |
| KR | 102108380 B1 | 5/2020 |

* cited by examiner

*Primary Examiner* — Khai Tran

(57) ABSTRACT

A system includes a first device including a first transmitter and a first receiver, and a second device including a second transmitter and a second receiver and configured to communicate with the first device. The two devices perform a first equalization operation by performing a first phase in which the first receiver performs a signal tuning operation on the second transmitter, a second phase in which the second receiver performs a signal tuning operation on the first transmitter, and one or more other phases. The first, second, and other phases may constitute all the phases of the first equalization operation, and some of the other phases may precede the first and second phases. In response to detection of an error after the first equalization operation, the two devices may perform a second equalization operation by performing the first phase, the second phase, or both, but not performing the other phases.

19 Claims, 5 Drawing Sheets

SYSTEM AND OPERATING METHOD THEREOF

CROSS-REFERENCES TO RELATED APPLICATION

The present application claims priority under 35 U.S.C. § 119(a) to Korean application number 10-2022-0061017, filed on May 18, 2022, and Korean application number 10-2022-0080852, filed on Jun. 30, 2022, in the Korean Intellectual Property Office, which are incorporated herein by reference in their entirety.

BACKGROUND

1. Technical Field

The present disclosure relates to a system, and more particularly, to a data processing system.

2. Related Art

Recently, a paradigm for a computer environment is shifting to ubiquitous computing, which allows a computer system to be used anytime and anywhere. Thus, the use of portable electronic devices such as mobile phones, digital cameras, and notebook computers is rapidly increasing. Such portable electronic devices generally use a memory system, that is, a data storage device. The memory system is used as a main storage device or an auxiliary storage device of a data processing system such as a portable electronic device.

When a memory system has no mechanical driving part, it has excellent stability and durability and also has an advantage that an information access speed is very fast and power consumption is low. Memory systems having such advantages include universal serial bus (USB) memory devices, memory cards having various interfaces, solid state drives (SSDs), and the like.

SSDs may use a Peripheral Component Interconnect express (PCIe)-based nonvolatile memory express (NVMe) interface as a high-speed interface connected to a host.

SUMMARY

Various embodiments are directed to providing a system capable of quickly performing an equalization operation and a recovery process by skipping unnecessary phases, and an operating method thereof.

A system in accordance with an embodiment of the present disclosure may include: a first device including a first transmitter and a first receiver; and a second device including a second transmitter and a second receiver and configured to communicate with the first device, wherein the first device and the second device perform a first equalization operation by performing a plurality of phases, the plurality of phases including: a first phase in which the first receiver performs a signal tuning operation on the second transmitter, a second phase in which the second receiver performs a signal tuning operation on the first transmitter, and one or more other phases, and wherein in response to detection of an error after the first equalization operation, the first device and the second device perform a second equalization operation by: performing the first phase, the second phase, or both, and not performing the one or more other phases.

A method of operating a system in accordance with an embodiment of the present disclosure is an operating method of a system including a first device provided with a first transmitter and a first receiver and a second device provided with a second transmitter and a second receiver, and the method may include: performing, by the first device and the second device, a first equalization operation by performing a plurality of phases, the plurality of phases including: a first phase in which the first receiver performs a signal tuning operation on the second transmitter, a second phase in which the second receiver performs a signal tuning operation on the first transmitter, and one or more other phases; and in response to detecting an error after the first equalization operation, performing, by the first device and the second device, a second equalization operation by: performing the first phase, the second phase, or both, and not performing the one or more other phases.

A system and an operating method thereof in accordance with an embodiment of the present disclosure may quickly perform an equalization operation and a recovery process by skipping unnecessary phases.

DETAILED DESCRIPTION

Figure 1:
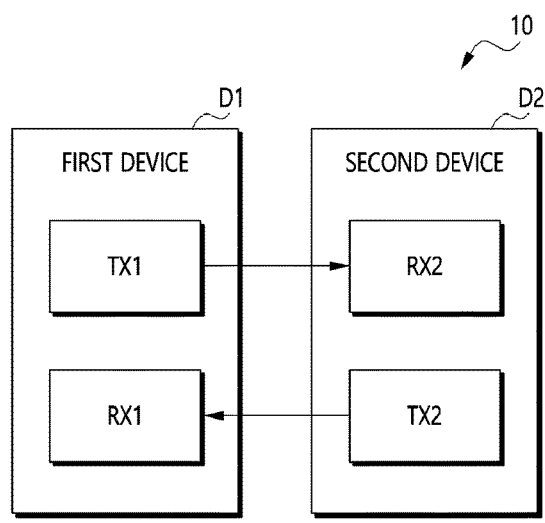
FIG. 1 is a block diagram illustrating a system in accordance with an embodiment of the present disclosure.

In the present disclosure, advantages, features and techniques for achieving them will become more apparent after a reading of the following illustrative embodiments taken in conjunction with the accompanying drawings. The present disclosure may, however, be embodied in different forms and should not be construed as being limited to the embodiments set forth herein. Rather, these embodiments are provided to describe the present disclosure in detail to the extent that a person skilled in the art to which the disclosure pertains can easily implement the technical concept of the present disclosure.

Embodiments of the present disclosure are not limited to the particulars shown in the drawings and that the drawings are not necessarily to scale and in some instances proportions may have been exaggerated in order to more clearly depict certain features of the disclosure. While particular terminology is used herein, it is to be appreciated that the terminology used herein is for the purpose of describing particular embodiments only and is not intended to limit the scope of the present disclosure.

As used herein, the term "and/or" includes any and all combinations of one or more of the associated listed items. When an element is referred to as being "on," "connected to" or "coupled to" another element, it may be directly on, connected or coupled to the other element or intervening elements may be present. As used herein, a singular form is intended to include plural forms as well, unless the context clearly indicates otherwise. The terms "includes" and/or "including," when used in this specification, specify the presence of at least one stated feature, step, operation, and/or element, but do not preclude the presence or addition of one or more other features, steps, operations, and/or elements thereof.

Hereinafter, an embodiment of the present disclosure will be described in detail with reference to the accompanying drawings.

FIG. 1 is a block diagram illustrating a system 10 in accordance with an embodiment of the present disclosure.

The system 10 may include a first device D1 and a second device D2. The first device D1 and the second device D2 may exchange signals with each other and perform a preset process.

The first device D1 may include a first transmitter TX1 and a first receiver RX1. The first transmitter TX1 may transmit a first signal to a second receiver RX2 of the second device D2. The first receiver RX1 may receive a second signal transmitted from a second transmitter TX2 of the second device D2.

The second device D2 may include the second transmitter TX2 and the second receiver RX2. The second transmitter TX2 may transmit the second signal to the first receiver RX1 of the first device D1. The second receiver RX2 may receive the first signal transmitted from the first transmitter TX1 of the first device D1.

The first device D1 and the second device D2 may communicate with each other on the basis of, for example, a protocol such as a universal serial bus (USB) protocol, a universal flash storage (UFS) protocol, a multi-media card (MMC) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, or a PCI express (PCI-E) protocol.

The first device D1 may be a higher-level device, a downstream port, or a root complex. The first device D1 may be a host device connected to a memory system such as an SSD. The second device D2 may be a lower-level device, an upstream port, an endpoint, or a memory system.

The first device D1 and the second device D2 may perform a recovery process according to a communication specification. The recovery process may be performed between the first device D1 and the second device D2 in order to optimize signal characteristics. The recovery process may be performed in order to change, for example, a communication speed between the first device D1 and the second device D2. The recovery process may be performed in order to change, for example, a lane structure between the first device D1 and the second device D2. The recovery process may be performed, for example, when a link error occurs between the first device D1 and the second device D2. For example, when the first device D1 determines that the recovery process is necessary, the recovery process may be performed according to the selection of the first device D1.

When the recovery process is performed in order to change the communication speed, the recovery process may include an equalization operation for assuring the signal quality between the first device D1 and the second device D2.

An initial equalization operation may be performed by performing all of a plurality of phases defined in the communication specification. The initial equalization operation may include an equalization operation performed for the first time after the system is powered on. The initial equalization operation may include an equalization operation performed after a predetermined time elapses from the immediately previously performed equalization operation. The initial equalization operation may be referred to as a first equalization operation.

A non-initial equalization operation may be performed as a response to a subsequent occurrence of an error after the initial equalization operation. The non-initial equalization operation may be performed by performing one or more necessary phases among the plurality of phases but not performing all of the plurality of phases. The non-initial equalization operation may include an equalization operation performed within a predetermined time from the immediately previously performed equalization operation. The non-initial equalization operation may be referred to as a second equalization operation.

Specifically, the first device D1 and the second device D2 may perform a first equalization operation of performing all of a predetermined plurality of phases. Among all the plurality of phases, a first phase may be a phase in which the first receiver RX1 performs a signal tuning operation on the second transmitter TX2, and a second phase may be a phase in which the second receiver RX2 performs a signal tuning operation on the first transmitter TX1. Here, "first phase" and "second phase" are merely designations for two of the plurality of phases, and do not imply an order of execution within the plurality of phases, that is, the first and second phases are not necessarily the first-performed and second-performed phases of the plurality of phases during the initial equalization operation, and other phases of the plurality of phases may be performed before, after, or both before and after the first and second phases. When detecting an error after the first equalization operation, the first device D1 and the second device D2 may perform a second equalization operation of performing only the first phase, the second phase, or both from among the plurality of phases. The first device D1 and the second device D2 may skip one or more other phases of the plurality of phases, except for the first phase, the second phase, or both, in the second equalization operation.

According to an embodiment, the other phases skipped in the second equalization operation may include phases for the first device D1 and the second device D2 to share initial setting values and variables before the first phase and the second phase are performed in the first equalization operation. According to an embodiment, when the first phase, the second phase, or both are performed in the second equalization operation, the first device D1 and the second device D2 may both apply the initial setting values and the variables shared in the first equalization operation.

According to an embodiment, by exchanging phase information indicating any one of the plurality of phases, the first device D1 and the second device D2 may perform the phases.

According to an embodiment, when the first receiver RX1 detects an error after the first equalization operation, the first device D1 may determine to perform the first phase in the second equalization operation. According to an embodiment, the first device D1 may transmit phase information indicating the first phase to the second device D2 in order to perform the first phase in the second equalization operation. According to an embodiment, the second device D2 may determine to perform the first phase in the second equalization operation in response to receiving the phase information indicating the first phase from the first device D1.

According to an embodiment, when the second receiver RX2 detects an error after the first equalization operation, the second device D2 may determine to perform the second phase in the second equalization operation. According to an embodiment, the second device D2 may transmit phase information indicating the second phase to the first device D1 in order to perform the second phase in the second equalization operation. According to an embodiment, the first device D1 may determine to perform the second phase in the second equalization operation in response to receiving the phase information indicating the second phase from the second device D2.

Figure 2:
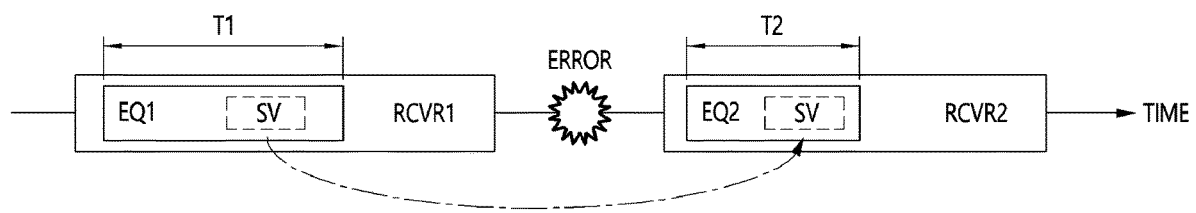
FIG. 2 schematically illustrates a process of performing a first equalization operation and a second equalization operation in accordance with an embodiment of the present disclosure.

FIG. 2 is a diagram schematically illustrating a method of performing a first equalization operation EQ1 and a second equalization operation EQ2 in accordance with an embodiment of the present disclosure.

Referring to FIG. 2, a first recovery process RCVR1 including the first equalization operation EQ1 may be performed. All of a plurality of phases defined in a communication specification may be performed in the first equalization operation EQ1.

After the first recovery process RCVR1 including the first equalization operation EQ1 is completed, the first receiver RX1 of the first device D1, the second receiver RX2 of the second device D2, or both may detect an error. In response, a second recovery process RCVR2 may be performed. In embodiments, unnecessary phases among all the phases may be skipped and only necessary phases may be performed in the second equalization operation EQ2 performed in the second recovery process RCVR2. For example, the phases skipped in the second equalization operation EQ2 may be phases for the first device D1 and the second device D2 to share initial setting values and variables SV. Because the initial setting values and the variables SV have already been shared during the first equalization operation EQ1, they may be applied as they are without being shared again in the second equalization operation EQ2.

According to an embodiment, even though an error is detected again after the second recovery process RCVR2 is completed and an $n^{th}$ (n>2) recovery process and an $n^{th}$ equalization operation are repeated, the $n^{th}$ equalization operation may be performed similarly to the second equalization operation EQ2.

An execution time T2 of the second equalization operation EQ2 in which unnecessary phases are skipped may be shorter than an execution time T1 of the first equalization operation EQ1. As a result, because the second recovery process RCVR2 is more quickly performed than the first recovery process RCVR1, the overall operating performance of the system 10 may be improved.

Figure 3:
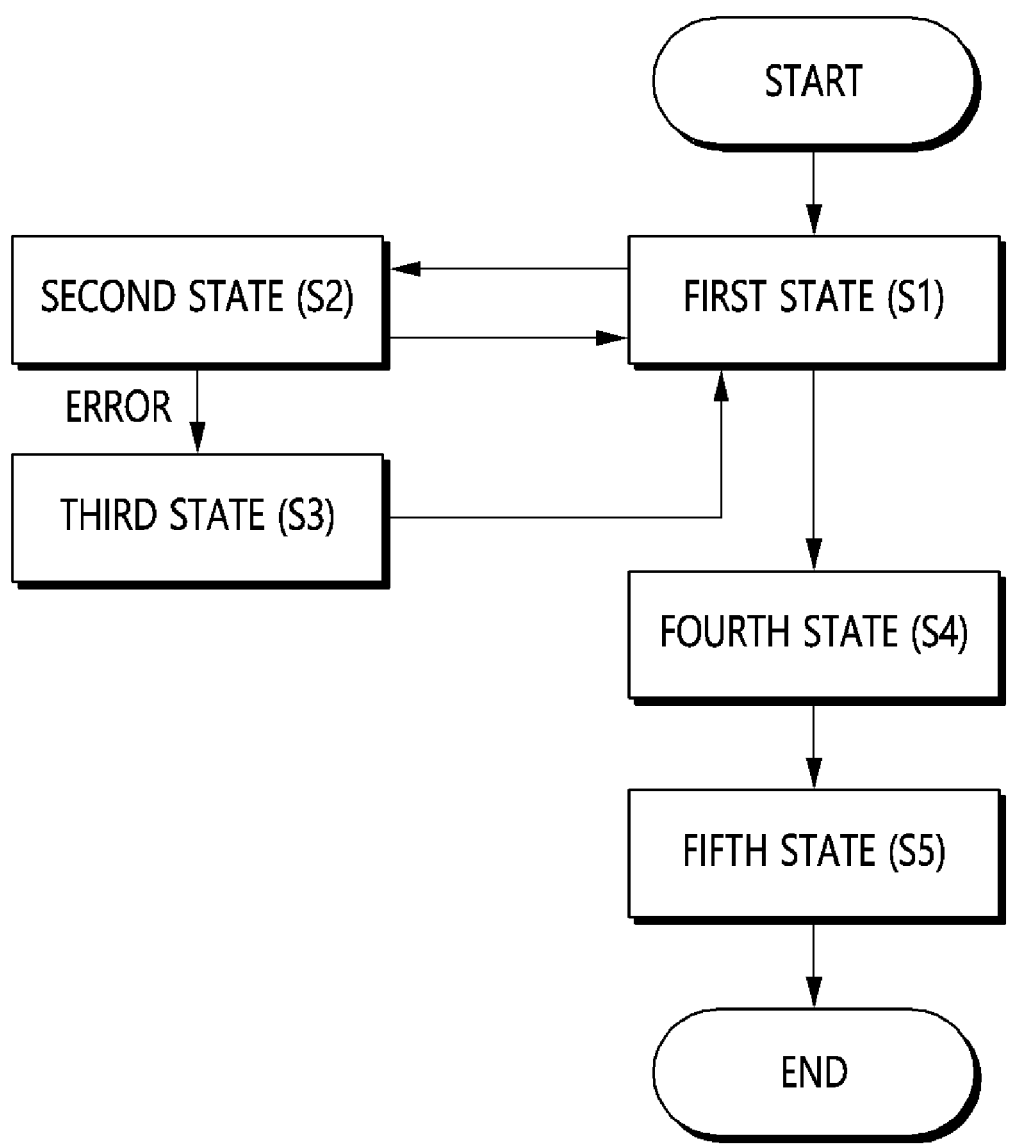
FIG. 3 illustrates a process in which a recovery process is performed from a first state to a fifth state in accordance with an embodiment of the present disclosure.

FIG. 3 is a diagram illustrating a process in which a recovery process is performed from a first state S1 to a fifth state S5 in accordance with an embodiment of the present disclosure. The first recovery process RCVR1 and the second recovery process RCVR2 in FIG. 2 may be performed according to the procedure illustrated in FIG. 3.

Referring to FIG. 3, the first state S1 may be the very first state in the recovery process. In the first state S1, the first receiver RX1 of the first device D1 and the second receiver RX2 of the second device D2 may check whether a received packet may be normally recognized. In the first state S1, the first device D1 and the second device D2 may determine a task (for example, a communication speed change task, a lane structure change task, or the like) to be performed in the current recovery process. When it is determined to perform the communication speed change task, the recovery process may enter the second state S2 under the control of the first device D1.

The second state S2 may be a state in which the first device D1 and the second device D2 set a new speed through an equalization operation and perform a signal tuning operation on the new speed. Specifically, the receiver of each device may adjust and tune characteristics of the transmitter of a counterpart device through the signal tuning operation. When the second state S2 proceeds without error, the recovery process may return to the first state S1. When an error (for example, a timeout) occurs in the second state S2, the recovery process may proceed to the third state S3.

The third state S3 may be a state in which the first device D1 and the second device D2 restore an original speed. That is, because an error has occurred at the new speed in the second state S2, the first device D1 and the second device D2 may apply the original speed again. Then, the recovery process may proceed from the third state S3 to the first state S1.

The fourth state S4 may be a state in which a lane-to-lane deskew is reset and the order of lanes is checked again. When the recovery process is returned to the first state S1 from the second state S2 or the third state S3, the recovery process may proceed from the first state S1 to the fourth state S4.

The fifth state S5 may be a state in which it is finally checked whether items corrected in the previous states are normally applied and maintained. When the recovery process is terminated after the fifth state S5, the first device D1 and the second device D2 may operate in a normal state, for example, the L0 state of a PCIe specification.

According to an embodiment, each of the first state S1 to the fifth state S5 may be Recovery.RcvrLock, Recovery.Equalization, Recovery.Speed, Recovery.RcvrCfg, and Recovery.Idle, respectively, of a link training status state machine (LTSSM) according to a PCIe specification.

Figure 4:
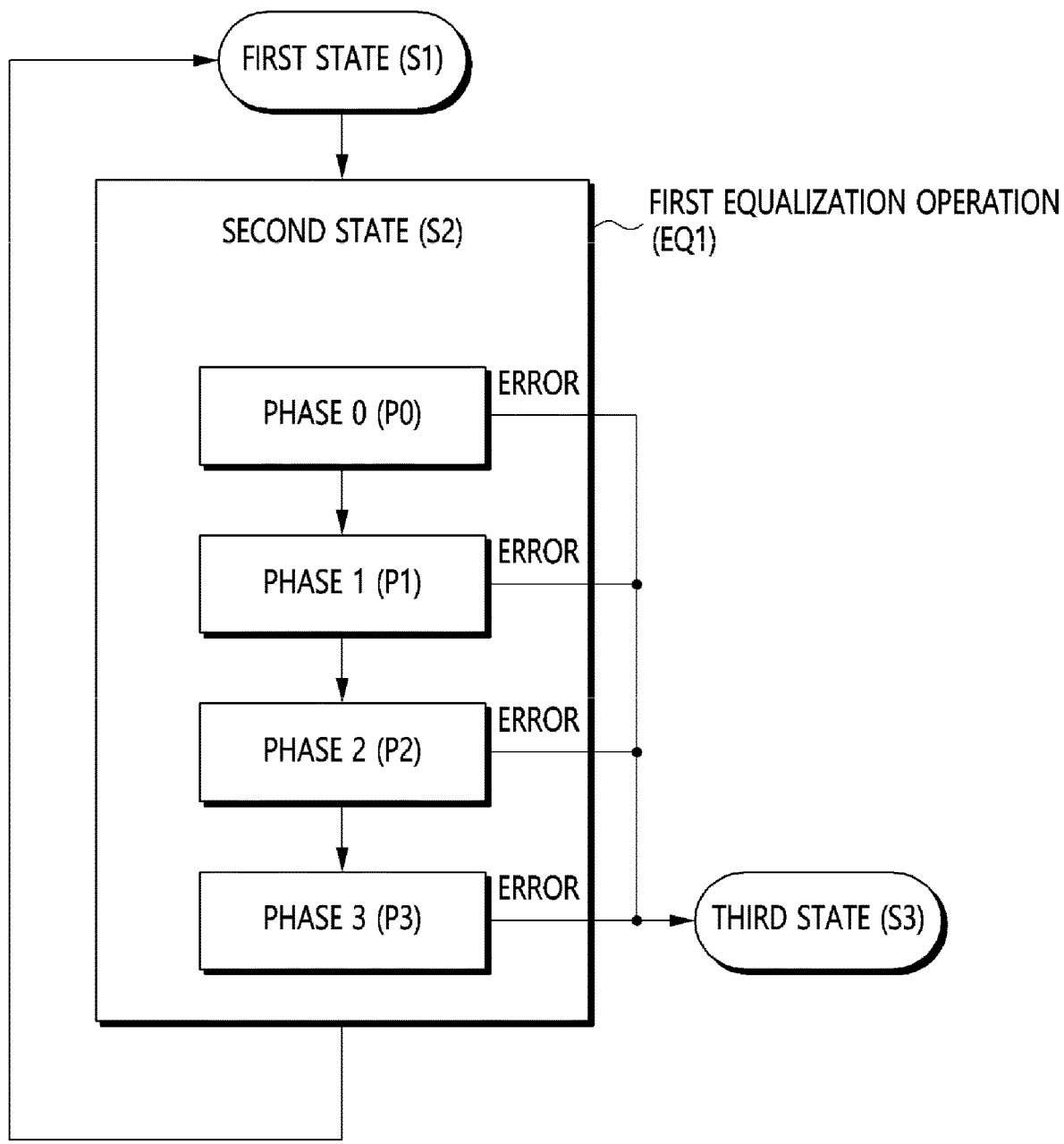
FIG. 4 illustrates a process in which a first equalization operation of a first recovery process in FIG. 2 is performed from phase 0 to phase 3 in accordance with an embodiment of the present disclosure.

FIG. 4 is a diagram illustrating a process in which the first equalization operation EQ1 of the first recovery process RCVR1 in FIG. 2 is performed from phase 0 (P0) to phase 3 (P3) in accordance with an embodiment of the present disclosure.

The phase 0 (P0) to the phase 3 (P3) may be all of a plurality of phases of an equalization operation defined according to the communication specification. Accordingly, when the first equalization operation EQ1, that is, an initial equalization operation is performed, all of the phase 0 (P0) to the phase 3 (P3) may be performed.

Specifically, in the first state S1 of the first recovery process RCVR1, the first device D1 may determine to enter the second state S2 in order to perform a communication speed change task. The first device D1 may control the first recovery process RCVR1 to enter the second state S2 by, for example, setting the start_equalization_w_preset value of the PCIe specification to 1b.

In the second state S2, the first device D1 and the second device D2 may perform the first equalization operation EQ1. The first equalization operation EQ1 may be performed by performing all of phase 0 (P0) to phase 3 (P3).

Specifically, the second device D2 may first enter the phase 0 (P0) in the second state S2. The second device D2 may transfer an initial setting value to the first device D1 in the phase 0 (P0) and then enter the phase 1 (P1). The initial setting value may include, for example, an initial transmitter preset and a receiver hint. The initial setting value may be maintained by both the first and second device D1 and D2 to be applied as it is in the subsequent second equalization operation EQ2.

The first device D1 may first enter the phase 1 (P1) in the second state S2. In the phase 1 (P1), the first device D1 and the second device D2 may enter the phase 2 (P2) after exchanging various predefined variables. The various predefined variables may include, for example, full swing and low frequency. The various predefined variables may be maintained by both the first and second device D1 and D2 to be applied as they are in the subsequent second equalization operation EQ2.

In the phase 2 (P2), the second receiver RX2 of the second device D2 may perform a signal tuning operation on the first transmitter TX1 of the first device D1. For example, the second device D2 may request the first transmitter TX1 of the first device D1 to transmit an first signal receivable by the second receiver RX2 of the second device D2, and determine the first signal, which is transmitted from the first transmitter TX1, as passing when there is no error in the signal. When the second device D2 determines the first signal as passing, the first device D1 and the second device D2 may enter the phase 3 (P3).

In the phase 3 (P3), the first receiver RX1 of the first device D1 may perform a signal tuning operation on the second transmitter TX2 of the second device D2. For example, the first device D1 may request the second transmitter TX2 of the second device D2 to transmit an second signal receivable by the first receiver RX1 of the first device D1, and determine the second signal, which is transmitted from the second transmitter TX2, as passing when there is no error in the signal. When the first device D1 determines the second signal as passing, the first equalization operation EQ1 may be terminated. The first recovery process RCVR1 may then return to the first state S1 from the second state S2.

However, when an error occurs in any one of the phase 0 (P0) to the phase 3 (P3), the first recovery process RCVR1 may enter the third state S3 from the second state S2, as described with reference to FIG. 2.

Figure 5:
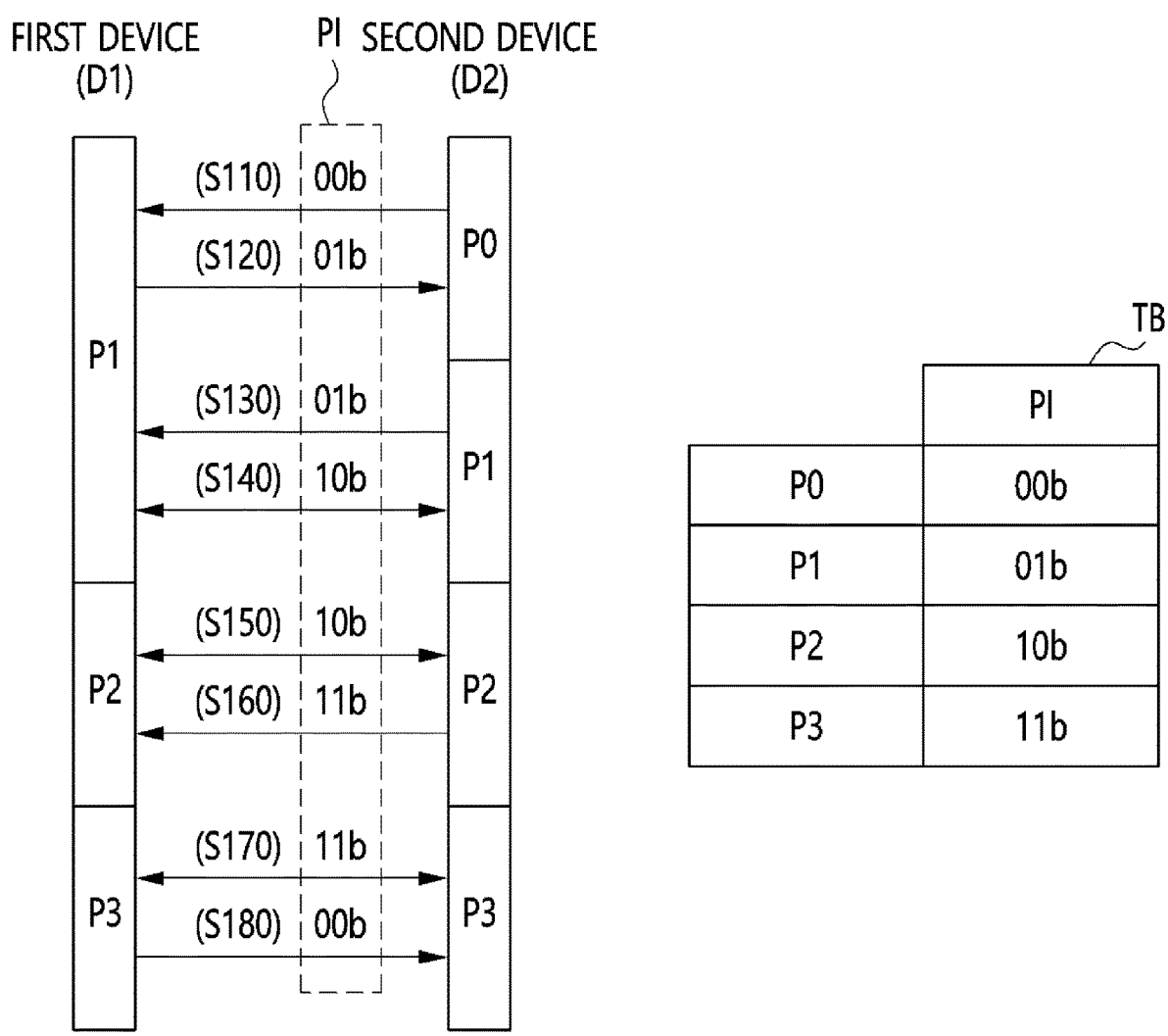
FIG. 5 illustrates a process in which a higher-level device and a lower-level device check a current phase through phase information and enter a next phase in accordance with an embodiment of the present disclosure.

FIG. 5 is a diagram illustrating a method in which the first device D1 and the second device D2 check a current phase through phase information PI in the first equalization operation EQ1 and enter a next phase in accordance with an embodiment of the present disclosure.

The first device D1 and the second device D2 may exchange the phase information PI with each other when in the second state S2. The phase information PI may be used to notify a counterpart device of a current phase or to enter a next phase. As shown in a table TB, the phase information PI, for example, 00b, 01b, 10b, and 11b may correspond to the phase 0 (P0), the phase 1 (P1), the phase 2 (P2), and the phase 3 (P3), respectively. The phase information PI may be, for example, an Equalization Control (EC) value of Training Sequence 1 Ordered Sets of a PCIe specification.

Specifically, in operation S110, the second device D2 may transmit the phase information PI of 00b to the first device D1 in order to notify the first device D1 that the second device D2 is in the phase 0 (P0). As described above, the second device D2 may transmit an initial setting value to the first device D1 during the phase 0 (P0).

In operation S120, the first device D1 may receive the initial setting value from the second device D2, and then transmit the phase information PI of 01b to the second device D2 twice or more, for example, so that the second device D2 enters the phase 1 (P1). In response to receiving the phase information PI of 01b from the first device D1, the second device D2 may enter the phase 1 (P1).

In operation S130, the second device D2 may transmit the phase information PI of 01b to the first device D1 in order to notify the first device D1 that the second device D2 is in the phase 1 (P1). As described above, the first device D1 and the second device D2 may exchange various variables with each other in the phase 1 (P1).

In operation S140, each of the first device D1 and the second device D2 may exchange various variables, and then transmit the phase information PI of 10b to a counterpart device twice or more, for example, in order to enter the phase 2 (P2). Each of the first device D1 and the second device D2 may transmit the phase information PI of 10b to a counterpart device and then enter the phase 2 (P2).

In operation S150, each of the first device D1 and the second device D2 may transmit the phase information PI of 10b to a counterpart device in order to notify the counterpart device that the transmitting device is in the phase 2 (P2). As described above, the second receiver RX2 of the second device D2 may perform a signal tuning operation on the first transmitter TX1 of the first device D1 in the phase 2 (P2).

In operation S160, the second device D2 may perform the signal tuning operation on the first transmitter TX1 and then transmit the phase information PI of 11b twice or more, for example, to the first device D1 in order to enter the phase 3 (P3). After transmitting the phase information PI of 11b to the first device D1, the second device D2 may enter the phase 3 (P3). In response to receiving the phase information PI of 11b from the second device D2, the first device D1 may enter the phase 3 (P3).

In operation S170, each of the first device D1 and the second device D2 may transmit the phase information PI of 11b to a counterpart device in order to notify the counterpart device that the first device D1 and the second device D2 are in the phase 3 (P3). As described above, the first receiver RX1 of the first device D1 may perform a signal tuning operation on the second transmitter TX2 of the second device D2 in the phase 3 (P3).

In operation S180, the first device D1 may perform the signal tuning operation on the second transmitter TX2, and then transmit predetermined phase information PI, for example, the phase information PI of 00b to the second device D2 two or more times, for example, in order to return to the first state S1 of the recovery process. After transmitting the phase information PI of 00b to the second device D2, the first device D1 may return to the first state S1 of the recovery process. In response to receiving the phase information PI of 00b from the first device D1, the second device D2 may return to the first state S1 of the recovery process.

Figure 6:
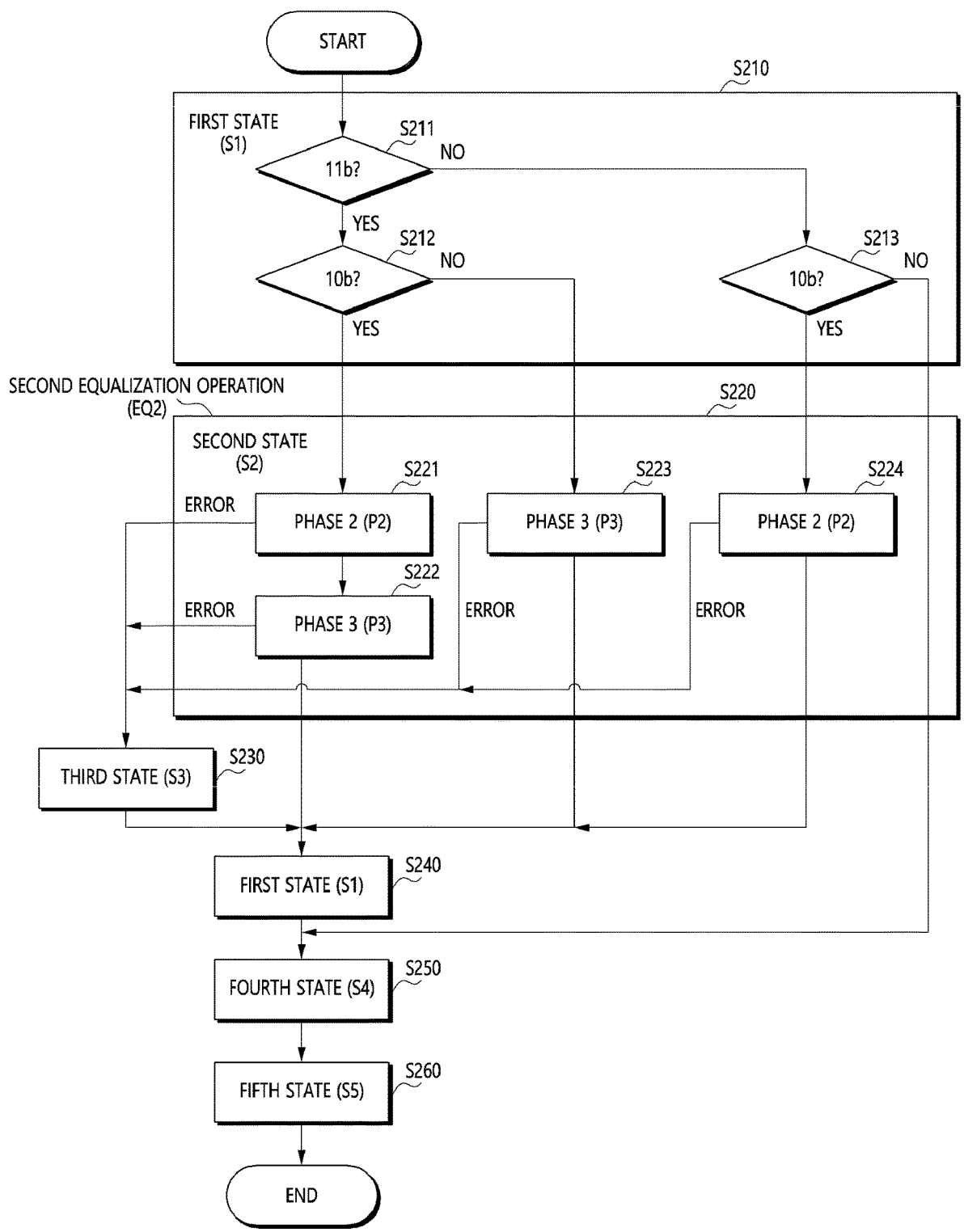
FIG. 6 is a flowchart illustrating a process of performing a second recovery process including a second equalization operation in accordance with an embodiment of the present disclosure.

FIG. 6 is a flowchart illustrating a process for performing the second recovery process RCVR2 including the second equalization operation EQ2 in FIG. 2 in accordance with an embodiment of the present disclosure. In the second recovery process RCVR2, the performance of the first state S1 to the fifth state S5 may be the same as described with reference to FIG. 3, except as noted below.

After the first recovery process RCVR1 including the first equalization operation EQ1 is completed, the first receiver RX1 of the first device D1, the second receiver RX2 of the second device D2, or both may detect an error. Accordingly, the second equalization operation EQ2 in FIG. 2, that is, a non-initial equalization operation, may be performed. When the non-initial equalization operation is performed, then from among all the phases P0 to P3 performed in the first equalization operation EQ1, only the phase 2 (P2), the phase 3 (P3), or both may be performed according to which device(s) needs to perform a signal tuning operation.

More specifically, when the phase 0 (P0) and the phase 1 (P1) are performed in the first equalization operation EQ1, the first device D1 and the second device D2 may share initial setting values and various variables with each other. Accordingly, the first device D1 and the second device D2 may both apply the already-shared initial setting values and various variables in the second equalization operation EQ2. If necessary, the initial setting values and various variables may be stored in separate registers in each device. As a result, the phase 0 (P0) and the phase 1 (P1) may be skipped in the second equalization operation EQ2.

When both the first receiver RX1 of the first device D1 and the second receiver RX2 of the second device D2 detect an error, both the phase 2 (P2) and the phase 3 (P3) may be performed. On the other hand, when only the second receiver RX2 of the second device D2 detects an error, only the phase 2 (P2) in which the second receiver RX2 performs a signal tuning operation may be performed, and the phase 3 (P3) may be skipped. When only the first receiver RX1 of the first device D1 detects an error, only the phase 3 (P3) in which the first receiver RX1 performs a signal tuning operation may be performed, and the phase 2 (P2) may be skipped. In order to communicate the phase in which a signal tuning operation is to be performed with each other, the first device D1 and the second device D2 may exchange phase information PI with each other before entering the second equalization operation EQ2. For example, the first device D1 in response to detecting a first error may transmit phase information PI indicating the phase 3 (P3) to the second device D2, and the second device D2 in response to detecting a second error may transmit phase information PI indicating the phase 2 (P2) to the first device D1.

Specifically, in operation S210 of FIG. 6, the second recovery process RCVR2 may enter the first state S1.

In operation S211, the second device D2 may determine whether the phase information PI transmitted from the first device D1 indicates the phase 3 (P3) (that is, 11b). When the phase information PI indicates phase 3 (P3), the procedure may proceed to operation S212. When the phase information PI does not indicate the phase 3 (P3), the procedure may proceed to operation S213.

In operation S212, the first device D1 may determine whether the phase information PI transmitted from the second device D2 indicates the phase 2 (P2) (that is, 10b). When the phase information PI indicates the phase 2 (P2), the procedure may proceed to operation S221. When the phase information PI does not indicate the phase 2 (P2), the procedure may proceed to operation S223.

In operation S213, the first device D1 may determine whether the phase information PI transmitted from the second device D2 indicates the phase 2 (P2) (that is, 10b). When the phase information PI indicates the phase 2 (P2), the procedure may proceed to operation S224. When the phase information PI does not indicate the phase 2 (P2), the procedure may proceed to operation S250.

In operation S220, the second recovery process RCVR2 may enter the second state S2 corresponding to the second equalization operation (EQ2).

In operation S221, the first device D1 and the second device D2 may enter the phase 2 (P2). The phase 2 (P2) may be performed as described with reference to FIG. 4 and FIG. 5. When an error does not occur in the phase 2 (P2), the procedure may proceed to operation S222. When an error occurs in the phase 2 (P2), the procedure may proceed to operation S230.

In operation S222, the first device D1 and the second device D2 may enter the phase 3 (P3). The phase 3 (P3) may be performed as described with reference to FIG. 4 and FIG. 5. When an error does not occur in the phase 3 (P3), the procedure may proceed to operation S240. When an error occurs in the phase 3 (P3), the procedure may proceed to operation S230.

In operation S223, the first device D1 and the second device D2 may enter the phase 3 (P3). The phase 3 (P3) may be performed as described with reference to FIG. 4 and FIG. 5. When an error does not occur in phase 3 (P3), the procedure may proceed to operation S240. When an error occurs in the phase 3 (P3), the procedure may proceed to operation S230.

In operation S224, the first device D1 and the second device D2 may enter the phase 2 (P2). The phase 2 (P2) may be performed as described with reference to FIG. 4 and FIG. 5. When an error does not occur in the phase 2 (P2), the procedure may proceed to operation S240. When an error occurs in the phase 2 (P2), the procedure may proceed to operation S230.

In operation S230, the second recovery process RCVR2 may enter the third state S3 as described with reference to FIG. 3.

In operation S240, the second recovery process RCVR2 may enter the first state S1 as described with reference to FIG. 3.

In operation S250, the second recovery process RCVR2 may enter the fourth state S4 as described with reference to FIG. 3.

In operation S260, the second recovery process RCVR2 may enter the fifth state S5 as described with reference to FIG. 3.

In an embodiment, the order of operation S211 and operation S212 may be reversed from the order shown in FIG. 6.

In summary, when the second equalization operation EQ2 is performed subsequent to the first equalization operation EQ1, unnecessary phases among all the phases performed in the first equalization operation EQ1 may be skipped and only necessary phases may be selectively performed. Before entering the second equalization operation EQ2, the first device D1 and the second device D2 may each easily and efficiently notify the other (counterpart) device of a necessary phase by exchanging phase information PI with each other. Accordingly, the recovery process may be quickly performed, and the possibility of occurrence of a timeout may be minimized.

A person skilled in the art to which the present disclosure pertains can understand that the present disclosure may be carried out in other specific forms without changing its technical spirit or essential features. Therefore, it should be understood that the embodiments described above are illustrative in all respects, not limitative. The scope of the present disclosure is defined by the claims to be described below rather than the detailed description, and it should be construed that the meaning and scope of the claims and all changes or modified forms derived from the equivalent concept thereof are included in the scope of the present disclosure.

What is claimed is:
1. A system comprising:
a first device including a first transmitter and a first receiver; and a second device including a second transmitter and a second receiver and configured to communicate with the first device,
wherein the first device and the second device perform a first equalization operation by performing a plurality of phases, the plurality of phases including:
a first phase in which the first receiver performs a signal tuning operation on the second transmitter,
a second phase in which the second receiver performs a signal tuning operation on the first transmitter, and
one or more other phases, and
wherein in response to detection of an error after the first equalization operation, the first device and the second device perform a second equalization operation by:
performing the first phase, the second phase, or both, and
not performing the one or more other phases.

2. The system according to claim 1, wherein the first phase, the second phase, and the one or more other phases constitute all the phases performed in the first equalization operation, and none of the one or more other phases are performed in the second equalization operation.

3. The system according to claim 2, wherein the one or more other phases include one or more phases for the first device and the second device to share initial setting values and variables before the first phase and the second phase are performed in the first equalization operation.

4. The system according to claim 3, wherein, when at least one of the first phase and the second phase is performed in the second equalization operation, the first device and the second device both apply the initial setting values and the variables shared in the first equalization operation.

5. The system according to claim 1, wherein the first device and the second device perform the plurality of phases by exchanging phase information indicating any one of the plurality of the phases.

6. The system according to claim 1, wherein, in response to the first receiver detecting an error after the first equalization operation, the first device determines to perform the first phase in the second equalization operation.

7. The system according to claim 6, wherein the first device transmits phase information indicating the first phase to the second device in order to perform the first phase in the second equalization operation.

8. The system according to claim 7, wherein the second device determines to perform the first phase in the second equalization operation on the basis of the phase information.

9. The system according to claim 1, wherein, in response to the second receiver detecting an error after the first equalization operation, the second device determines to perform the second phase in the second equalization operation.

10. The system according to claim 9, wherein the second device transmits phase information indicating the second phase to the first device in order to perform the second phase in the second equalization operation.

11. The system according to claim 10, wherein the first device determines to perform the second phase in the second equalization operation on the basis of the phase information.

12. A method of operating a system including a first device and a second device, the first device including a first transmitter and a first receiver, the second device including a second transmitter and a second receiver, the method comprising:
performing, by the first device and the second device, a first equalization operation by performing a plurality of phases, the plurality of phases including:
a first phase in which the first receiver performs a signal tuning operation on the second transmitter,
a second phase in which the second receiver performs a signal tuning operation on the first transmitter, and
one or more other phases; and
in response to detecting an error after the first equalization operation, performing, by the first device and the second device, a second equalization operation by:
performing the first phase, the second phase, or both, and
not performing the one or more other phases.

13. The method of claim 12, wherein the first phase, the second phase, and the one or more other phases constitute all the phases performed in the first equalization operation, and none of the one or more other phases are performed in the second equalization operation.

14. The method of claim 13, wherein the one or more other phases include one or more phases for the first device and the second device to share initial setting values and variables before the first phase and the second phase are performed in the first equalization operation.

15. The method of claim 14, wherein performing the second equalization operation comprises:
applying, by both the first device and the second device, the initial setting values and the variables shared in the first equalization operation when at least one of the first phase and the second phase is performed.

16. The method of claim 12, further comprising:
in response to the first receiver detecting an error after the first equalization operation, determining, by the first device, to perform the first phase in the second equalization operation.

17. The method of claim 16, further comprising:
transmitting, by the first device, phase information indicating the first phase to the second device in order to perform the first phase in the second equalization operation.

18. The method of claim 12, further comprising:
in response to the second receiver detecting an error after the first equalization operation, determining, by the second device, to perform the second phase in the second equalization operation.

19. The method of claim 18, further comprising:
transmitting, by the second device, phase information indicating the second phase to the first device in order to perform the second phase in the second equalization operation.

* * * * *